(12) United States Patent
Jakobs et al.

(10) Patent No.: US 9,643,486 B2
(45) Date of Patent: May 9, 2017

(54) TANK RECESS

(71) Applicant: Ford Global Technologies, LLC, Dearborn, MI (US)

(72) Inventors: Werner Jakobs, Bergisch Gladbach (DE); Rafal Pulczynski, Skawina (PL); Allen Brandt, Cologne (DE)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/700,330

(22) Filed: Apr. 30, 2015

(65) Prior Publication Data

US 2015/0246609 A1    Sep. 3, 2015

Related U.S. Application Data

(63) Continuation of application No. 14/000,732, filed as application No. PCT/EP2012/050976 on Jan. 23, 2012, now Pat. No. 9,039,063.

(30) Foreign Application Priority Data

Feb. 23, 2011    (DE) .................. 10 2011 004 556

(51) Int. Cl.
| | | |
|---|---|---|
| B62D 25/00 | (2006.01) | |
| B60K 15/04 | (2006.01) | |
| B60K 15/03 | (2006.01) | |
| B21D 39/02 | (2006.01) | |
| B60K 15/05 | (2006.01) | |

(52) U.S. Cl.
CPC .............. *B60K 15/04* (2013.01); *B21D 39/02* (2013.01); *B60K 15/03177* (2013.01); *B60K 2015/048* (2013.01); *B60K 2015/0451* (2013.01); *B60K 2015/0474* (2013.01); *B60K 2015/0487* (2013.01); *B60K 2015/0553* (2013.01); *Y10T 29/49915* (2015.01)

(58) Field of Classification Search
CPC .... G06F 1/1616; G06F 1/1632; G06F 1/1637; G06F 1/1656; G06F 1/1679; B60K 15/04; A01D 41/02; A01D 41/1208; A01D 41/1217; B62D 11/003
USPC ....................................... 296/97.22; 220/86.2
See application file for complete search history.

(56) References Cited

U.S. PATENT DOCUMENTS

| | | | |
|---|---|---|---|
| 1,485,738 A | | 3/1924 | Taft |
| 3,159,409 A | * | 12/1964 | Koehler ................. B60K 15/04 141/115 |

(Continued)

FOREIGN PATENT DOCUMENTS

| | | |
|---|---|---|
| CN | 101643025 | 2/2010 |
| DE | 102010015033 | 11/2010 |
| JP | 2005199769 | 7/2005 |

*Primary Examiner* — Kiran B Patel
(74) *Attorney, Agent, or Firm* — Diederiks & Whitelaw, PLC

(57) ABSTRACT

A tank recess for motor vehicles comprising a recess body having a device for fastening to a vehicle body opening from outside and having a tank feed line sealing portion, characterized in that the recess body has a fold-over sealing edge on the base portion, such that a flange on an inner metal plate of the vehicle body opening is encompassed by the fold-over sealing edge, such that in the installed position the sealing edge is able to be placed sealingly around the flange of the vehicle body opening.

16 Claims, 2 Drawing Sheets

(56) References Cited

U.S. PATENT DOCUMENTS

| | | | |
|---|---|---|---|
| 4,142,756 A | 3/1979 | Henning et al. | |
| 4,811,984 A | 3/1989 | Hempel | |
| 4,917,157 A | 4/1990 | Gifford et al. | |
| 5,090,760 A | 2/1992 | Wheeler | |
| 5,118,155 A * | 6/1992 | Koop | B60K 15/05 220/86.2 |
| 5,165,749 A * | 11/1992 | Sheppard | B60K 15/05 220/86.2 |
| 5,246,132 A | 9/1993 | Muth et al. | |
| 5,320,147 A | 6/1994 | Jamrog | |
| 5,437,491 A * | 8/1995 | Nedbal | B60K 15/05 220/86.2 |
| 5,462,190 A | 10/1995 | Lienhart et al. | |
| 5,839,489 A * | 11/1998 | Ganachaud | B60K 15/04 141/301 |
| 5,954,387 A * | 9/1999 | Fisher | B60K 15/0406 220/86.2 |
| 6,033,006 A * | 3/2000 | Bovellan | B60K 15/04 220/86.2 |
| 6,193,093 B1 | 2/2001 | Brunner | |
| 6,435,233 B1 * | 8/2002 | Miura | B60K 15/04 141/332 |
| 6,931,729 B2 | 8/2005 | Hiramatsu et al. | |
| 6,942,117 B2 | 9/2005 | Foltz | |
| 6,962,177 B1 | 11/2005 | McCommons | |
| 7,281,640 B2 | 10/2007 | Hagano et al. | |
| 7,311,348 B1 * | 12/2007 | Bang | B60K 15/0406 220/86.2 |
| 7,390,048 B2 * | 6/2008 | Yoshimura | B29C 45/4407 296/208 |
| 7,647,955 B2 | 1/2010 | Murabayashi et al. | |
| 7,677,278 B2 | 3/2010 | Pacitto et al. | |
| 8,162,375 B2 | 4/2012 | Gurtatowski et al. | |
| 8,215,333 B2 * | 7/2012 | Stokes | B60K 15/04 137/312 |
| 8,382,187 B2 * | 2/2013 | Guendouz | B60K 15/0406 141/348 |
| 8,544,932 B2 | 10/2013 | Herzig | |
| 8,556,326 B2 | 10/2013 | Zentner | |
| 8,657,300 B2 * | 2/2014 | Wolff | F16J 15/022 277/634 |
| 8,714,212 B2 | 5/2014 | Watson et al. | |
| 8,794,467 B2 * | 8/2014 | Zentner | B60K 15/04 141/313 |
| 8,807,369 B2 | 8/2014 | Sasaki | |
| 8,844,587 B1 | 9/2014 | McCommons | |
| 8,899,285 B2 * | 12/2014 | Hagano | B60K 15/04 141/350 |
| 9,266,428 B2 * | 2/2016 | Kobayashi | B60K 15/05 |
| 2007/0210607 A1 * | 9/2007 | Murabayashi | B60K 15/03519 296/97.22 |
| 2008/0136210 A1 | 6/2008 | Scott et al. | |
| 2009/0026794 A1 | 1/2009 | Zentner et al. | |
| 2010/0218849 A1 * | 9/2010 | Hagano | B60K 15/04 141/350 |
| 2013/0249234 A1 * | 9/2013 | Higgins | B60K 15/05 296/97.22 |
| 2013/0249235 A1 * | 9/2013 | Lorenc | B60K 15/04 296/97.22 |
| 2013/0257089 A1 * | 10/2013 | Minock | B60K 15/05 296/97.22 |

* cited by examiner

TANK RECESS

CROSS-REFERENCE TO RELATED APPLICATIONS

This application is a continuation of U.S. patent application Ser. No. 14/000,732 filed Aug. 21, 2013, which is the National Stage of International Application No. PCT/EP2012/050976 entitled "Tank Recess" and filed Jan. 23, 2012. The entire content of these applications is incorporated herein by reference.

BACKGROUND OF THE INVENTION

The invention relates to a tank recess for motor vehicles comprising a recess body having means for fastening to a vehicle body opening from outside and having a tank feed line sealing section.

In motor vehicles it is known to allow the tank feed line of the fuel tank to be terminated in a tank recess and to close the tank feed line by means of a closure. A pivot bearing for a fuel cap is located on the tank recess, said fuel cap being able to be held securely by means of a locking system or lock system. If the locking is released, for example a transverse bolt is pulled out of a locking attachment, the flap is able to be opened. Such tank recesses generally comprise a through-hole or connector for the tank feed line, into which the fuel nozzle is inserted when refueling.

A trough-like recess body is able to be used for the tank recess which is arranged in a through-opening in the vehicle body. In this case, for obvious reasons, it is extremely important that the transition between the tank feed line and the recess body is well sealed. Additionally, it is also important that the recess body and/or the tank recess is not only fastened to the vehicle body but also is sealed relative thereto. In this case, not only the outer metal plate but also the inner metal plate of the vehicle body has to be taken into account.

Thus a one-piece tank recess for motor vehicles having a recess body and a connecting part is disclosed in DE 10 2008 017 687 A1. The recess body is made of a first plastics materials which at one end has a flange for fastening to a vehicle body opening and with a base portion and/or connecting part made of a second plastics material molded integrally with the recess body, which is more flexible than the first plastics material and has an opening for sealingly receiving a filler pipe made of relatively hard material. A reinforcing portion is integrally formed on the connecting part, said reinforcing potion also consisting of the first plastics material and providing resistance to radial and/or peripheral deformation of the connecting part. The connecting part has two lips which cooperate with a perforated edge of an inner metal plate of a motor vehicle, in order to carry out the fastening to the inner metal plate.

Experience has shown that it is difficult to mount such a tank recess from the outside and thus to achieve a secure seal relative to the inner metal plate of the vehicle body.

SUMMARY OF THE INVENTION

The object of the invention is to provide a tank recess in which reduced mounting complexity is required and the final mounting is able to be undertaken from the outside.

Simple mounting and sealing may be achieved as the recess body has a fold-over sealing edge on the base portion, such that a flange on the inner metal plate of the vehicle body opening is encompassed by the fold-over sealing edge, such that in the installed position said sealing edge is able to be sealingly placed around the flange of the vehicle body opening. The recess body is inserted in the known manner from the outside into the vehicle body opening and fastened. Subsequently, the sealing edge may be folded back from its stretched installed position into its final sealed position.

The flange is able to be formed, on the one hand, by the inner metal plate of the vehicle body itself or by a connecting part which is separate from the recess body. Thus, said part is initially fastened from the inside to the vehicle body opening and subsequently displaced as explained above.

If the tank feed line sealing portion is arranged between the base portion and the fold-over sealing edge, the tank feed line and/or the filler pipe are able to be connected in a simple manner to the sealing portion of the recess body.

According to the invention, in a method for mounting a tank recess to a vehicle body opening of a motor vehicle, the following steps are carried out:

forming a flange on the inner metal plate of the vehicle body opening;

fastening a recess body from outside onto the vehicle body opening (by inserting the base portion together with the sealing edge into the vehicle body opening) and folding over a sealing edge on the base portion of the recess body over the flange in a sealed manner.

When fastening the recess body from outside onto the vehicle body opening by inserting the base portion together with the sealing edge into the vehicle body opening, therefore, the sealing edge is guided in a stretched inserted position through the vehicle body opening, so that subsequently it is able to be folded over into its final sealed position. This may carried out in a simple manner from the outside using the hands and fingers (or a suitable tool). Complicated or costly operations are no longer required.

DETAILED DESCRIPTION OF THE PREFERRED EMBODIMENTS

Figure 1:
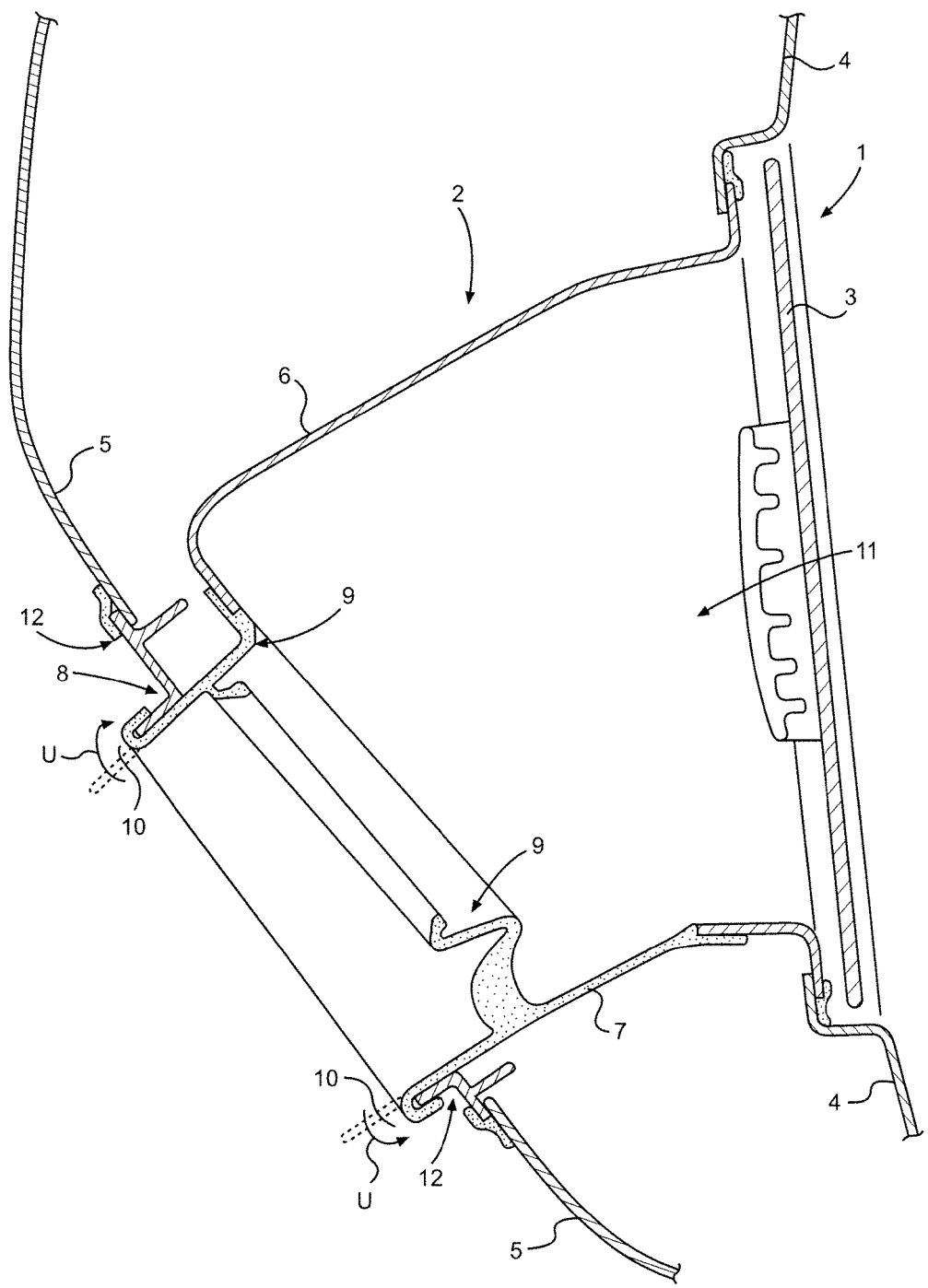
FIG. 1 shows a schematic section of a tank recess with a flange formed from a connecting part that is fastened to the inner plate of a motor vehicle.
Figure 2:
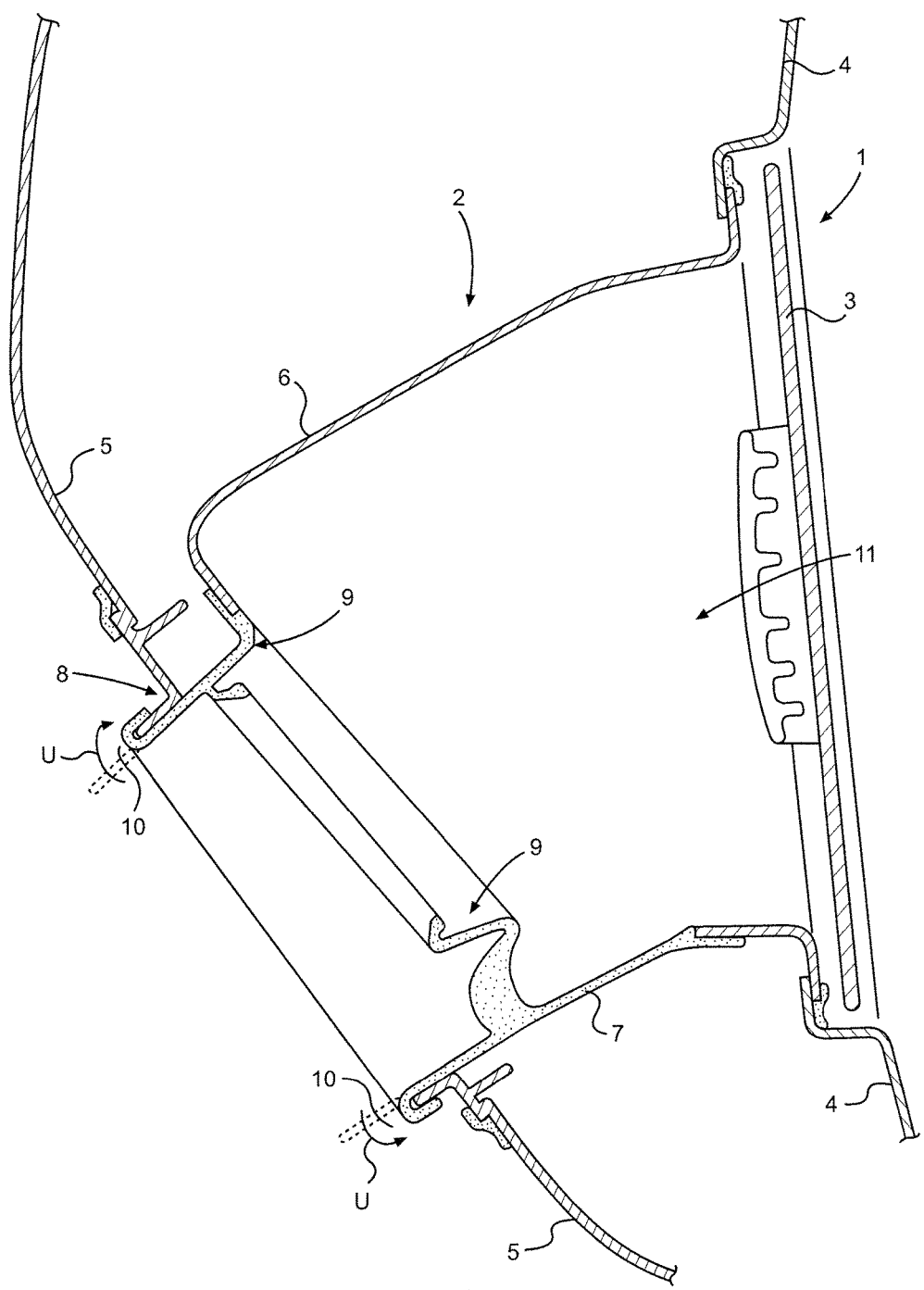
FIG. 2 shows a schematic section of a tank recess with a flange formed integrally with the inner plate of the motor vehicle.

Further details, features and advantages of the invention are revealed from the following description of exemplary embodiments, with reference to FIGS. 1 and 2 in which a schematic section through a tank recess 1 is shown.

The tank recess 1 comprises in section an approximately U-shaped recess body 2 which has a filler cap 3 which is able to be pivoted open and shut. The recess body 2 is fastened from the outside to the outer metal plate 4 of a vehicle body opening 11 and extends inwards along the vehicle body opening 11 to the inner metal plate 5.

The recess body 2 comprises a first region 6 with a wall made of a more rigid plastics and a base portion 7 adjacent thereto made of a more flexible plastics material which is injection-molded thereon. The base portion 7 has at the lower end, i.e. in the region of the inner metal plate 5 of the vehicle body opening 11, a flexible, rubber elastic and tubular sealing edge 10.

Said sealing edge is configured so as to grip sealingly around a peripheral flange 8 in the final position. In the present case, as shown in FIG. 1, the flange is formed from a separate connecting part 12 which is fastened from the inside on the vehicle body opening 11 to the inner metal plate 5 and forms a seal with the inner metal plate 5. Alternatively, flange 8 is formed from the inner metal plate 5, as shown in FIG. 2, wherein the flange 8 is formed integrally with the inner metal plate 5.

Between the first region 6 and the sealing edge 10 of the recess body 2, a tubular tank feed line seal 9 is formed which projects and/or protrudes inwardly in order to receive the tank feed line, not shown, subsequently in a sealed manner.

In order to mount the tank recess 1, the connecting part 12 is initially fastened from inside into the vehicle body opening 11 to the inner metal plate 5 to form the flange 8, as shown in FIG. 1 or the flange 8 is formed integrally with the inner plate 5, as shown in FIG. 2.

Then the recess body 2 is inserted and fastened from the outside onto the outer metal plate 4 of the vehicle body opening 11. In this case, the sealing edge 10 is inserted in a "stretched" installed position (dashed lines in the figure) into the vehicle body opening 11 so that the sealing edge 10 also penetrates the vehicle body opening 11 on the inner metal part 5 and protrudes beyond the flange 8.

Subsequently from the outside, for example using the finger, the sealing edge 10 is able to be folded over into a final position on the flange 8 for peripheral sealing in the direction of the arrow U (solid lines in the Figures). By the elastic tensioning of the folded-over sealing edge 10, said sealing edge bears tightly and thus sealingly and securely against flange 8.

The invention claimed is:

1. A fuel tank recess body for a motor vehicle including an outer plate and an inner plate, said fuel tank recess body comprising:
    a first region adapted to be fastened to the outer plate;
    a base portion including a sealing edge configured to fold over a flange of the inner plate.

2. The tank recess body of claim 1, wherein the flange is formed from a connecting part that is fastened to the inner plate.

3. The tank recess body of claim 1, wherein the flange is formed integrally with the inner plate.

4. The tank recess body of claim 1, wherein the tank recess body is located in a vehicle body opening of the motor vehicle.

5. A fuel tank recess body located in a body opening of a motor vehicle including an outer plate and an inner plate, said fuel tank recess body comprising:
    a first region fastened to the outer plate;
    a base portion including a sealing edge folded over a flange of the inner plate; and
    a tank feed line seal configured to receive a tank feed line.

6. The tank recess body of claim 1, wherein the first region is rigid and the base portion is flexible.

7. The tank recess body of claim 1, wherein the sealing edge is foldable between a stretched installed position and a final sealed position.

8. The tank recess body of claim 1 wherein the base portion is a flexible base portion connected to the first region and the sealing edge is configured to fold over a flange of the inner plate when the tank recess body is placed between the outer and inner plates, thereby holding the tank recess body in place.

9. The tank recess body of claim 8, wherein the sealing edge is foldable between a stretched installed position and a final sealed position.

10. The fuel tank recess body of claim 8, wherein the first region is rigid.

11. The fuel tank recess body of claim 8, wherein the base portion further includes a tank feed line seal adapted to seal against a tank feed line.

12. The fuel tank recess body of claim 11, wherein the tank feed line seal is tubular.

13. The tank recess body of claim 8, wherein the flange is formed from a connecting part that is fastened to the inner plate.

14. The tank recess body of claim 8, wherein the flange is formed integrally with the inner plate.

15. The tank recess body of claim 8, wherein the tank recess body is located in a vehicle body opening of the motor vehicle.

16. A fuel tank recess, mountable within a motor vehicle having an outer plate and an inner plate, for providing access to a fuel tank feed line, said fuel tank recess comprising:
    a tank recess body including a rigid first region adapted to be fastened to the outer plate and a flexible base portion connected to the first region, the base portion having a tubular tank feed line seal, adapted to seal against the tank feed line, and a fold-over sealing edge; and
    a flange mounted on the inner plate for receiving the fold-over sealing edge whereby, when the tank recess body is placed between the outer and inner plates, the fold-over sealing edge is configured to fold over the flange, thereby holding the tank recess body in place.

* * * * *